(No Model.) 2 Sheets—Sheet 1.

L. DESMARAIS.
POTATO DIGGER AND LOADER.

No. 507,087. Patented Oct. 17, 1893.

Witnesses:
K. J. Jacker.
Flora L. Brown.

Inventor:
Louis Desmarais,
By Charles Turner Brown,
Atty.

(No Model.) 2 Sheets—Sheet 2.
L. DESMARAIS.
POTATO DIGGER AND LOADER.
No. 507,087. Patented Oct. 17, 1893.
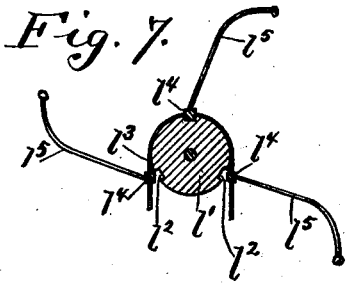
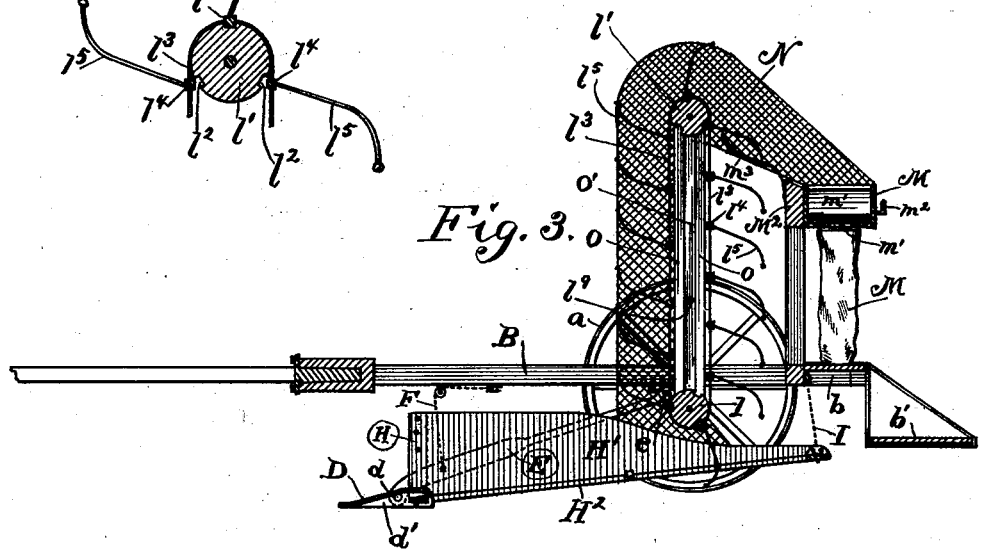
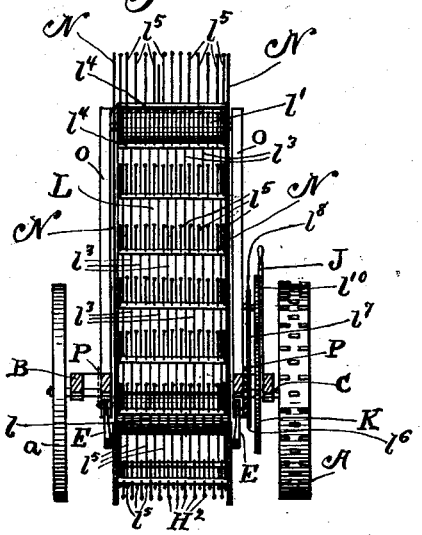
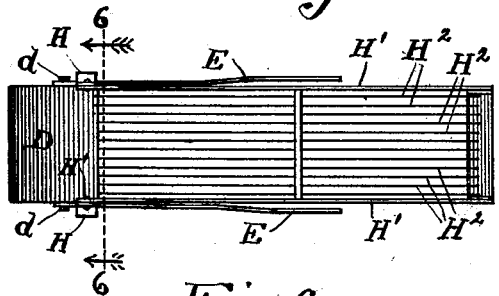
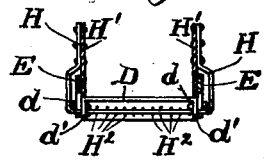
Witnesses:
R. J. Jacker.
Flora L. Brown.
Inventor:
Louis Desmarais,
By Charles Turner Brown,
Atty.

UNITED STATES PATENT OFFICE.

LOUIS DESMARAIS, OF CHICAGO, ILLINOIS.

POTATO DIGGER AND LOADER.

SPECIFICATION forming part of Letters Patent No. 507,087, dated October 17, 1893.

Application filed January 5, 1893. Serial No. 457,346. (No model.)

*To all whom it may concern:*

Be it known that I, LOUIS DESMARAIS, residing at Chicago, in the county of Cook and State of Illinois, have invented certain new and useful Improvements in Potato Diggers and Loaders, of which the following, when taken in connection with the drawings accompanying and forming a part hereof, is a full and complete description, sufficient to enable those skilled in the art to which it pertains to make and use the same.

This invention relates to a machine designed to dig potatoes and load the same in bags as the machine is hauled over the potato field by horses or other power.

The objects of the invention are to obtain a potato digger and loader which will dig and load or bag the potatoes as the machine is hauled over the field; a potato digger and loader which can be readily taken from one field to another; and a potato digger and loader which can be easily handled and controlled when in use.

I have illustrated my invention by the drawings referred to, wherein—

Figure 1:
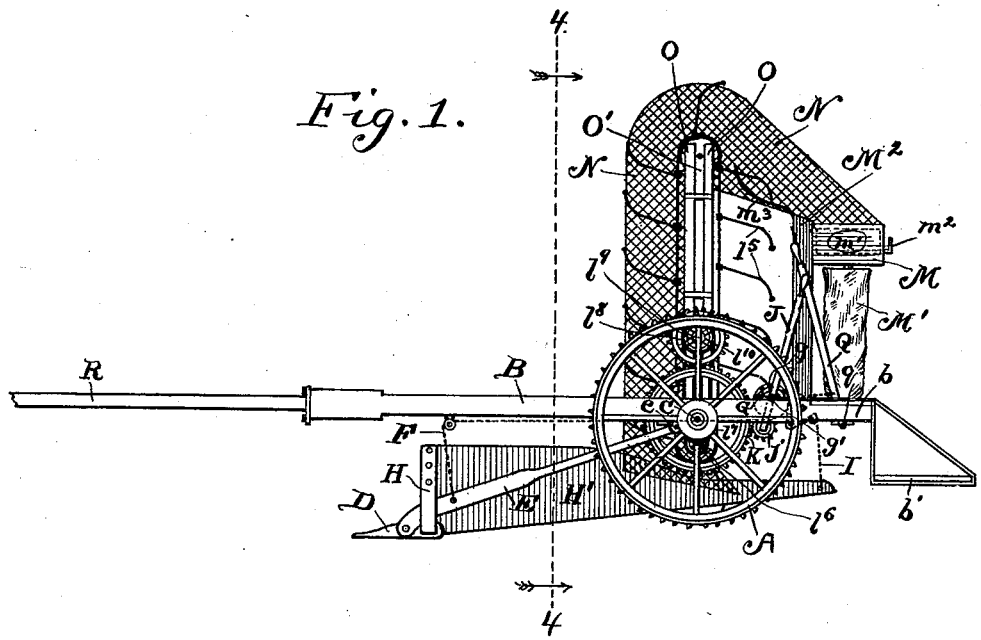
Figure 2:
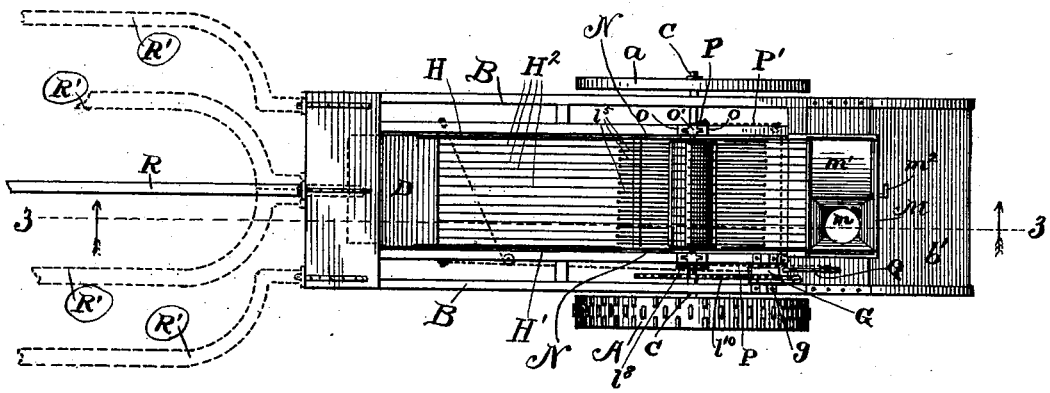

Figure 1 is a side elevation of the potato digger and loader, or the potato digger and bagger; Fig. 2 a top plan view thereof; Fig. 3 a sectional view on line 3—3 of Fig. 2, viewed in the direction indicated by the arrows; Fig. 4, a sectional view on line 4—4 of Fig. 1, viewed in the direction indicated by the arrows; Fig. 5, a top plan view of the plow and follower thereof forming an element in the machine; Fig. 6, a sectional view on line 6—6 of Fig. 5, viewed in the direction indicated by the arrows and Fig. 7, a sectional view, on an enlarged scale, of a portion of the elevating or lifting mechanism of the device embodying my invention.

The same letter of reference is used to indicate a given part where more than one view thereof is shown.

A, *a*, are the wheels of the sulky frame on which the device embodying my invention is mounted.

B, is the sulky frame, and consists of frame *b* and platform *b'*.

C, C, are the axles or shafts on which wheels A *a* are mounted.

D is a plow or digger pivotally mounted by means of bolts *d d*, on arms E E. Arms E E are, respectively, mounted by means of the respective pivots *e e*, on sulky frame B.

F is a chain secured at one end thereof to bar E and at the other end thereof extending around drum G, by means of which, in a hereinafter described manner, the lower end of arm E with plow or digger D thereon, can be raised or lowered or maintained in any desired position.

H is a " U " shaped bar extending through the downwardly turned flanges *d' d'* of plow or digger D, and H' H', respectively, are the sides of the follower of plow or digger D, such sides being, respectively, secured to the vertical portion of the " U " shaped bar H.

H² H² H² are wires attached at their forward ends to the horizontal portion of the " U " shaped bar H, forming the bottom of the follower of the plow or digger D.

I is a chain attached to the rear end of the follower formed by the sides H' H' and the wires H² H² H² and extending therefrom to and around the drum G. Through this chain I, the rear end of the follower is raised or lowered by the winding or unwinding of such chain on the drum G. Drum G can be turned by hand, and chains F I, respectively, so wound or unwound thereon, but I prefer that the turning of such drum whereby the chains are wound thereon shall be effected, when desired, by the forward movement of the machine and for this purpose I mount on drum G, gear wheel *g* intermeshing with gear *j* mounted on lever J. Lever J is pivotally mounted or fulcrumed on shaft *g'* of drum G.

K is a gear wheel mounted on axle or shaft C so as to turn in unison with the driving wheel A. Gear wheel *j* is adapted to intermesh with gear wheel K and will intermesh therewith when lever J is in the position illustrated in Fig. 1, and thereby forward movement of the potato-digger and loader, producing forward rotation of driving wheel A, will cause rotation in the same direction of drum G, thereby winding chains F, I, respectively, around such drum G. When the chains are wound around such drum so that plow or digger D and the follower thereof consisting of the sides H', H', and wires H² H² H² are in the desired position; that is, so as to be elevated above the ground or depressed below the ground according to whether the machine is to be hauled over the ground without digging potatoes or so as to dig potatoes, gear wheel $j$ is, by the forward movement of the upper end of lever J, retracted from intermeshing with gear wheel K, and drum G then maintained in its determined position by a brake or dog in the ordinary manner.

When the potato-digger and loader is in operation digging potatoes the plow or digger and the follower thereof are lowered to a proper adjustment and as the device is hauled over the field the plow or digger will extend below the potatoes, and thereby such potatoes, together with the dirt over the plow or digger, will be brought over the wires $H^2$ $H^2$ $H^2$, forming the bottom of the follower. The dirt will readily pass through the spaces between the several wires, but the potatoes will remain on the wires until removed therefrom. In order to remove the potatoes from the wires $H^2$ $H^2$ $H^2$ and to load or bag them at the same time I construct the hereinafter described mechanism.

L is an elevator, consisting of drums $l$, $l'$, having grooves $l^2$ $l^2$ therein, wire ropes or chains $l^3$ $l^3$ $l^3$, bars $l^4$ $l^4$ $l^4$, fingers or prongs $l^5$ $l^5$ $l^5$, sprocket wheel $l^6$, sprocket chain $l^7$ extending to and around sprocket wheel $l^8$, such sprocket wheel $l^8$ being secured firmly to rotatable shaft $l^9$, and gear wheel $l^{10}$ also secured to shaft $l^9$, and adapted to intermesh with gear wheel K hereinbefore described.

M is a box having two openings $m$, $m$, in the bottom thereof, underneath which openings, respectively, a bag M' adapted to receive potatoes is placed.

$m'$, is a movable partition in box M, by means of which potatoes are directed through one or the other of the holes $m$, $m$, and into the bag or receptacle thereunder and $m^2$, is the handle by which movable partition $m'$ is changed.

$M^2$, is the frame-work to which the box M is secured and $m^3$, $m^3$, are prongs extending from frame $M^2$ outward and upward to receive and guide into the box M, potatoes delivered thereon from the several prongs $l^5$, $l^5$, of the elevator L.

N, is a guard which may be constructed of wire netting $g$, extending around that portion of the elevator whereon potatoes are contained in the operation of the machine.

In hauling my machine to and from a field, the elevator thereof should not be operated; and in the use of the machine in digging and loading or bagging potatoes, it frequently occurs that the elevator should be stopped while the machine is being hauled along; hence, to enable me to quickly stop such elevator and to maintain it in an inoperative position, I provide the following mechanism:

O, O, are uprights extending upward from part $b$ of the sulky frame B.

O', O', are vertically movable uprights, held in place between uprights O, O. The shafts of drums $l$, $l'$, respectively, and shaft $l^9$, are rotatably journaled in bearings secured to uprights O', O', respectively; and hence, by providing means for raising the uprights O', O', respectively, the elevator is raised. To accomplish this, I attach the chains P, P', to uprights O', O', respectively, and extend such chains upward from the point of attachment thereof to and over the pulleys $p$, $p$, respectively, and from thence to lever Q, to which lever such chains are secured. Lever Q is fulcrumed by pivots $q$ on part $b$, of sulky B. When lever Q is in the position in which it is illustrated in Fig. 1, the elevator is lowered in the sulky frame and gear wheels $l^{10}$ and K intermesh. By turning such lever Q toward the left hand the elevator is raised by means of the chains $p$, $p$, attached as described and gear wheels $l^{10}$ and K do not intermesh.

In order that more than one horse may be hitched to the device, I provide the pole R and shafts R', R'. Pole R and shafts R' R', are removable from platform $b$ of sulky B and shafts R', R', are constructed so that the same may be inserted in place of the pole R, in the manner indicated by the dotted lines in Fig. 2, and when so inserted in place of the pole R, a single horse may be hitched, between such shafts, to the machine.

While I have described the machine embodying my invention as a potato-digger and loader, it will be evident to those skilled in the art that beets or turnips, and the like, may be dug and loaded by the device, the operation being the same as in digging and loading potatoes.

It will be observed that the axles or shafts C, C, respectively, do not extend from one side of the sulky frame to the other, but do extend from wheels A, $a$, respectively, into, or nearly so, the uprights O', O', respectively, so that such uprights may extend from below part $b$, of the sulky B, upward to the axle or shaft of the drum $l'$ of the elevator L.

Having thus described my invention, what I claim, and desire to secure by Letters Patent, is—

1. In a potato digger, the combination of a sulky frame, a drum rotatably mounted thereon, a lever also mounted on the sulky frame, a gear wheel rotatably journaled on such lever, and adapted to be intermeshed with a gear wheel actuated by the driving wheel of the sulky frame or to be retracted from intermeshing therewith by the movement of the lever, and mechanism connecting such gear wheel mounted on the lever and the drum so that rotation on the gear wheel will produce corresponding rotation of the drum; substantially as described.

2. In a combined potato-digger and loader, the combination of a sulky frame, bars fulcrumed to the sulky frame, a plow attached to the forward end of the bars, a follower consisting of sides and a bottom composed of parallel wires attached to the plow, a drum on the sulky frame, a gear wheel attached to the drum, flexible connections extending from the plow and the follower to the drum, a lever on the sulky frame and a gear wheel rotatably journaled on such lever and intermeshing with the gear wheel secured to the drum and adapted to be intermeshed with a gear wheel actuated by the driving wheel of the sulky frame or to be retracted from intermeshing therewith by the movement of the lever; substantially as described.

3. In a potato-digger and loader, an elevator consisting of rigid uprights secured to the sulky frame, movable uprights held in place between the rigid uprights rotatable drums journaled in the movable uprights, flexible connections extending around the drums, bars secured to such flexible connections and wire prongs on such bars, a sprocket wheel rigidly secured to the shaft of one of the drums, a sprocket chain extending over such sprocket wheel and over a second sprocket wheel rigidly secured to a shaft rotatably journaled in the movable uprights, a gear wheel also secured to the last named rotatable shaft, and adapted to intermesh with the gear on the driving wheel of the sulky or to be retracted from intermeshing therewith by the raising of the movable uprights, a lever fulcrumed on the sulky frame and flexible connections extending from the movable uprights to the lever, a plow adjustably attached to the sulky frame, a follower, the bottom whereof consists of parallel wires secured to the plow and between which wires the wire prongs on the bars of the elevator extend in the operation of the elevator; substantially as described.

LOUIS DESMARAIS.

Witnesses:
CHARLES TURNER BROWN,
FLORA L. BROWN.